(12) United States Patent
Warren et al.

(10) Patent No.: US 9,316,479 B2
(45) Date of Patent: Apr. 19, 2016

(54) CAPACITANCE BASED CLEARANCE PROBE AND HOUSING

(71) Applicant: United Technologies Corporation, Hartford, CT (US)

(72) Inventors: Eli Cole Warren, Wethersfield, CT (US); Corey Benoit, Uncasville, CT (US)

(73) Assignee: United Technologies Corporation, Hartford, CT (US)

( * ) Notice: Subject to any disclaimer, the term of this patent is extended or adjusted under 35 U.S.C. 154(b) by 222 days.

(21) Appl. No.: 13/623,322

(22) Filed: Sep. 20, 2012

(65) Prior Publication Data

US 2014/0076037 A1    Mar. 20, 2014

(51) Int. Cl.
*G01M 15/14*    (2006.01)
*G01B 7/16*    (2006.01)

(52) U.S. Cl.
CPC ........................................ *G01B 7/22* (2013.01)

(58) Field of Classification Search
CPC .................................................. G01M 15/14
USPC ......................................... 73/112.01, 112.03
See application file for complete search history.

(56) References Cited

U.S. PATENT DOCUMENTS

| 4,483,195 | A  | * | 11/1984 | Brown et al. ................... 73/702 |
| 6,364,524 | B1 | * | 4/2002  | Markham ..................... 374/131 |
| 7,017,415 | B2 | * | 3/2006  | Harrold et al. .................. 73/702 |
| 7,215,129 | B1 | * | 5/2007  | Andarawis et al. ........... 324/662 |
| 7,596,954 | B2 |   | 10/2009 | Penda et al. |
| 7,677,118 | B2 | * | 3/2010  | Mizuno ...................... 73/862.69 |
| 7,913,579 | B2 | * | 3/2011  | Mizuno ...................... 73/862.69 |
| 7,918,642 | B2 | * | 4/2011  | Leogrande et al. ........... 415/118 |
| 8,006,544 | B2 | * | 8/2011  | Holmes et al. ............. 73/112.01 |
| 8,102,539 | B2 |   | 1/2012  | Ghulam |
| 8,220,319 | B2 | * | 7/2012  | Schleif et al. .............. 73/112.01 |
| 8,281,649 | B1 | * | 10/2012 | Crutchfield et al. ....... 73/112.01 |
| 8,961,115 | B2 | * | 2/2015  | Rhoden et al. ............. 415/173.2 |
| 2006/0002789 | A1 |   | 1/2006  | Haffner et al. |
| 2006/0005529 | A1 |   | 1/2006  | Penda et al. |
| 2006/0132147 | A1 | * | 6/2006  | Balasubramaniam et al. ............................. 324/662 |
| 2007/0020095 | A1 | * | 1/2007  | Dierksmeier et al. ..... 415/173.1 |
| 2008/0187436 | A1 | * | 8/2008  | Leogrande et al. ........... 415/118 |
| 2008/0267769 | A1 | * | 10/2008 | Schwarz et al. .............. 415/148 |
| 2009/0003991 | A1 | * | 1/2009  | Andarawis et al. ........... 415/118 |
| 2009/0220333 | A1 | * | 9/2009  | Bilson et al. .................. 415/118 |
| 2010/0046008 | A1 |   | 2/2010  | Ghulam |
| 2010/0116066 | A1 | * | 5/2010  | Mizuno ...................... 73/862.69 |
| 2010/0162722 | A1 | * | 7/2010  | McQuiggan et al. ........... 60/782 |
| 2012/0085156 | A1 | * | 4/2012  | Gaisnon et al. ............. 73/112.01 |
| 2014/0064924 | A1 | * | 3/2014  | Warren ........................ 415/118 |
| 2014/0090492 | A1 | * | 4/2014  | Warren ........................ 73/866.5 |
| 2014/0366613 | A1 | * | 12/2014 | Warren et al. ............. 73/112.01 |

FOREIGN PATENT DOCUMENTS

GB            2112080        7/1983

* cited by examiner

*Primary Examiner* — Eric S McCall
(74) *Attorney, Agent, or Firm* — Carlson, Gaskey & Olds, P.C.

(57) ABSTRACT

A capacitance based clearance probe has a partial sensor housing mounted on a surface and a sensor rod anchored in the partial sensor housing. The sensor rod extends into a sensor opening in the surface such that the partial sensor housing and the surface combine to operate as a complete sensor housing.

22 Claims, 3 Drawing Sheets

CAPACITANCE BASED CLEARANCE PROBE AND HOUSING

BACKGROUND OF THE INVENTION

The present disclosure is directed generally toward capacitance based clearance probes, and more specifically toward a capacitance based clearance probe built into a metal surface.

Gas turbine engines, such as those utilized in commercial aircraft, include multiple rotors and stators configured to enable optimal operation. Turbine engines maintain an optimal clearance (distance) between the tips of the rotors and an outside diameter of a gas path within the turbine engine, and thereby provide the conditions necessary to achieve a desired performance.

The gas turbine engine performance is validated, in part, by measuring the blade tip clearance. In order to measure the tip clearance, one or more tip clearance probes are installed in the outer air seal wall of the turbine engine. As the tip clearance probes are incorporated onto the outer air seal of the gas turbine after the outer air seal has been manufactured, it is necessary to re-operate the outer air seal casing to accommodate the tip clearance probe. Existing tip clearance probe arrangements require the outer air seal casing to further accommodate the housing of the tip clearance probe, thereby limiting the locations on the outer air seal that can accept the tip clearance probe and requiring significant additional re-operation of the outer air seal.

SUMMARY OF THE INVENTION

An outer seal case for a turbine engine according to an exemplary embodiment of this disclosure, among other possible things includes an outer air seal housing having a sensor opening, a partial sensor housing contacting the outer air seal housing, and a sensor rod extending from said partial sensor housing through said sensor opening in the outer air seal housing such that the partial housing and the outer air seal housing combine to operate as a complete sensor housing.

A further embodiment of the foregoing outer air seal case wherein the sensor opening comprises a hole defining an axis, and the hole has a first width perpendicular to the axis along a first portion of the axis and a second width perpendicular to the axis along a second portion of the axis.

A further embodiment of the foregoing outer air seal case includes a first sensor rod support pad positioned in the partial sensor housing and a second sensor rod support pad positioned in the outer air seal housing, wherein each of the first sensor rod support pad and the second sensor rod support pad maintain the sensor rod in position within the outer air seal case.

A further embodiment of the foregoing outer air seal case wherein each of the first and the second sensor rod support pad are under compression.

A further embodiment of the foregoing outer air seal case includes a nut within the partial sensor housing, the nut is interfaced with the sensor rod, thereby anchoring the sensor rod in place.

A further embodiment of the foregoing outer air seal case wherein the nut is threaded and is interfaced with a threaded portion of the sensor rod.

A further embodiment of the foregoing outer air seal case wherein the sensor rod is fixed to the nut via a weld.

A further embodiment of the foregoing outer air seal case wherein the nut and the outer air seal housing maintain the sensor rod in tension.

A further embodiment of the foregoing outer air seal case wherein the partial sensor housing further includes a lead egress and a cap.

A further embodiment of the foregoing outer air seal case wherein a combination of the partial sensor housing and the outer air seal has a first thermal expansion rate, the sensor rod has a second thermal expansion rate, and the first thermal expansion rate and the second thermal expansion rate are different.

A capacitance based clearance probe according to an exemplary embodiment of this disclosure, among other possible things includes a partial sensor housing mounted on a surface, a sensor rod anchored in the partial sensor housing and extending into a sensor opening is the surface such that the partial sensor housing and the surface combine to operate as a complete sensor housing.

A further embodiment of the capacitance based clearance probe wherein the sensor opening includes a hole defining an axis, and the hole has a first width perpendicular to the axis along a first portion of the axis and a second width perpendicular to the axis along a second portion of the axis.

A further embodiment of the capacitance based clearance probe further includes a first sensor rod support pad positioned in the partial sensor housing and a second sensor rod support pad positioned in the outer air seal housing, wherein each of the first sensor rod support pad and the second sensor rod support pad maintain the sensor rod in position within the outer air seal case.

A further embodiment of the capacitance based clearance probe wherein each of the first and the second sensor rod support pad are under compression.

A further embodiment of the capacitance based clearance probe further including a nut within the partial sensor housing, the nut is interfaced with the sensor rod, thereby anchoring the sensor rod in place.

A further embodiment of the capacitance based clearance probe the nut is threaded and is interfaced with a threaded portion of the sensor rod.

A further embodiment of the capacitance based clearance probe the sensor rod is fixed to said nut via a weld.

A further embodiment of the capacitance based clearance probe the nut and the outer air seal housing maintain the sensor rod in tension.

A further embodiment of the capacitance based clearance probe the partial sensor housing further comprises a lead egress and a cap.

A further embodiment of the capacitance based clearance probe wherein a combination of the partial sensor housing and the outer air seal has a first thermal expansion rate, the sensor rod has a second thermal expansion rate, and the first thermal expansion rate and the second thermal expansion rate are different.

A further embodiment of the capacitance based clearance probe wherein the first thermal expansion note is greater than the second thermal expansion rate, thereby maintaining the sensor rod in tension.

These and other features of the present invention can be best understood from the following specification and drawings, the following of which is a brief description.

DETAILED DESCRIPTION

Figure 1:
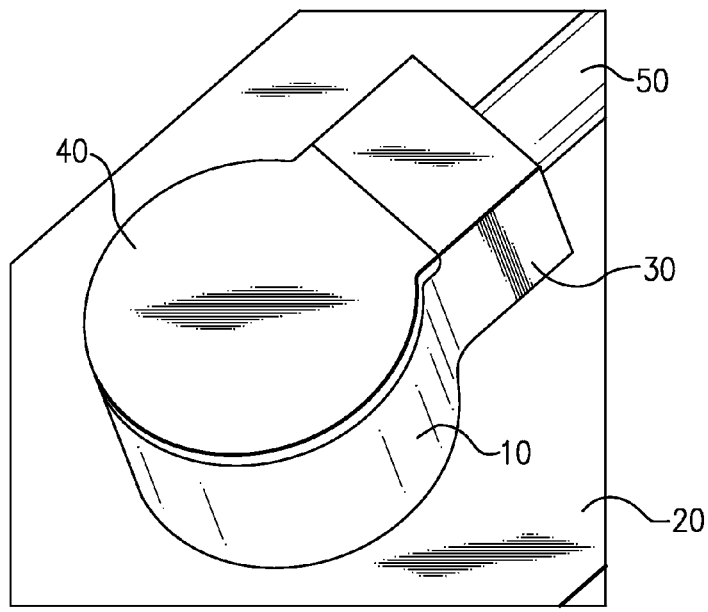
FIG. 1 schematically illustrates an isometric view of a capacitance probe built into a metal surface.

FIG. 1 illustrates a capacitance probe 10 that is built into a metal housing 20 such as the housing of an outer air seal (OAS) for a turbine engine. The illustrated capacitance probe 10 is a tip clearance probe, however it is understood that similar capacitance probes 10 could be used for alternative clearance measurements. A sensor portion of the capacitance probe 10 is partially enclosed within a partial sensor housing 30. A sensor cap 40 is affixed to the top of the partial sensor housing 30, and encloses the sensor portion within the partial sensor housing 30. The sensor portion detects the clearance within the metal housing 20 by determining the capacitance between the sensor face and the target, which in the illustrated example is a blade tip. An electric lead 50 exits the housing 30 via a lead egress and connects the sensor portion within the partial sensor housing 30 to a controller (not pictured), or to any other system that is operable to receive and act upon sensor measurements.

Figure 2:
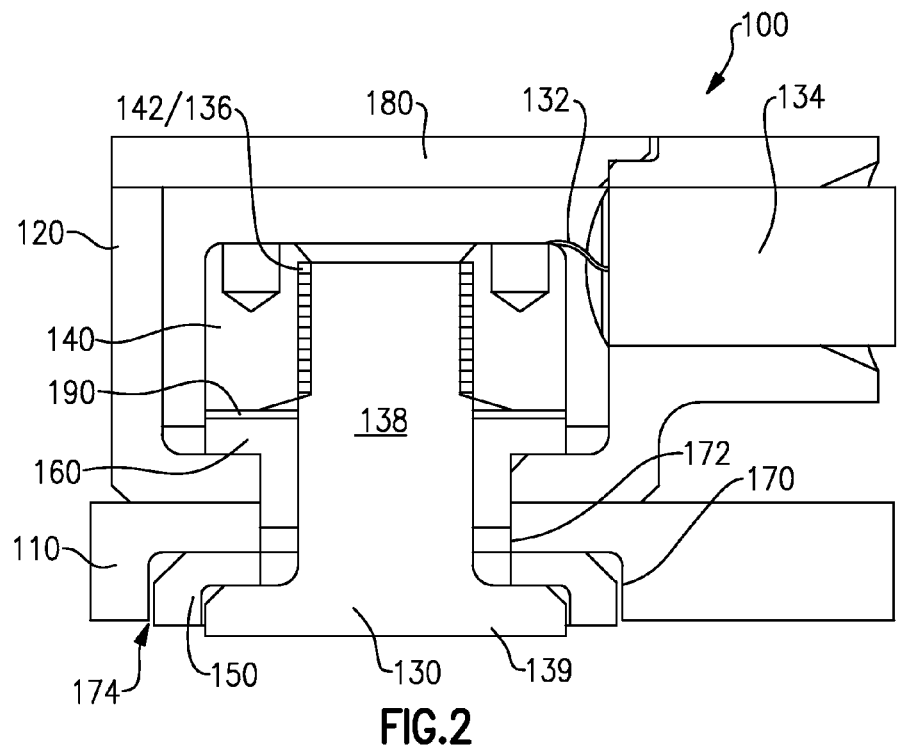
FIG. 2 illustrates a cross section of an example capacitance probe.

FIG. 2 illustrates a cross sectional side view of an example capacitance Probe 100. The example capacitance probe 100 is built into an outer air seal wall 110 of a turbine engine with a partial sensor housing 120 encompassing the portions of the capacitance probe 100 not encompassed within the outer air seal wall 110. A sensor rod 130 is anchored in the partial sensor housing 120 via a nut 140 and extends through an opening 170, 172 in the outer air seal wall 110. A cap 180 is located over the top of the partial sensor housing 120 and seals the capacitance probe 100. The cap 180 can be affixed to the partial sensor housing 120 using a weld, an adhesive, or any other suitable technique.

The nut 140 anchors the sensor rod 130 within the partial sensor housing 120 -by interfacing with the sensor rod 130 and holding the sensor rod 130 in tension. In the illustrated example, the nut 140 and the sensor rod 130 are interfaced using threading 136 on the sensor rod 130 and threading 142 on the nut 140. Anchoring the sensor rod 130 prevents the sensor rod 130 from becoming misaligned and maintains the sensor rod 130 under tension.

The sensor rod 130 is communicatively coupled to a lead 134 via a sensor wire 132. The sensor wire 132 is connected to the nut 140 on one end and the lead 134 on an opposite end. In alternate examples, the sensor wire 132 is connected directly to the sensor rod 130. The illustrated sensor wire 132 is connected to the nut 140 using an electric discharge weld. It is understood in light of this disclosure, however, that alternate types of connections can maintain the contact between the sensor wire 132 and the nut 140 or the sensor rod 130 and achieve similar affects.

The sensor rod 130 includes a stem portion 138, and a sensor face portion 139. The stem portion 138 of the sensor rod 130 protrudes through a smaller diameter hole portion 172 of a sensor hole 174 in the outer air seal wall 110, and the sensor face portion 139 of the sensor rod 130 fits within a wider diameter hole portion 170 of the sensor hole 174 in the outer air seal wall 110. In alternate examples, the sensor hole 174 is not circular. Also located within the larger diameter portion 170 of the sensor hole 174 is a ceramic pad 150 that maintains the position of the sensor face portion 139 of the sensor rod 130. Similarly, a second ceramic pad 160 is positioned primarily in the partial sensor housing 120 and extends into the smaller diameter hole portion 172 of the sensor hole 174. The second ceramic pad 160 further maintains the position of the sensor rod 130. By housing the sensor face portion 139 in the outer air seal wall 110, the size of the through sensor hole 174 in the outer air seal wall 110 required by the capacitance probe 100 is minimized, and needs only to account for the stem portion of the sensor rod 130 and the second ceramic 160 instead of additionally accounting for the capacitance probe housing. The minimization of the diameter of the through hole portion of the sensor hole 174 in the outer air seal wall 110, in turn, increases the strength and stiffness of the outer air seal wall 110, and reduces the amount of labor required to reoperate the wall for installation of the capacitance probe 100.

A shim 190, such as a washer, separates the nut 140 from the second ceramic pad 160 and controls the friction between the nut 140 and the surface that the nut 140 contacts, thereby allowing the nut 140 to be controllably torqued during installation. By increasing the control over the torque placed on the nut 140 during installation, the ability to control the preloading of the sensor rod 130 is increased and instances of inadvertent damage during installation and improper installations are decreased.

Figure 3:
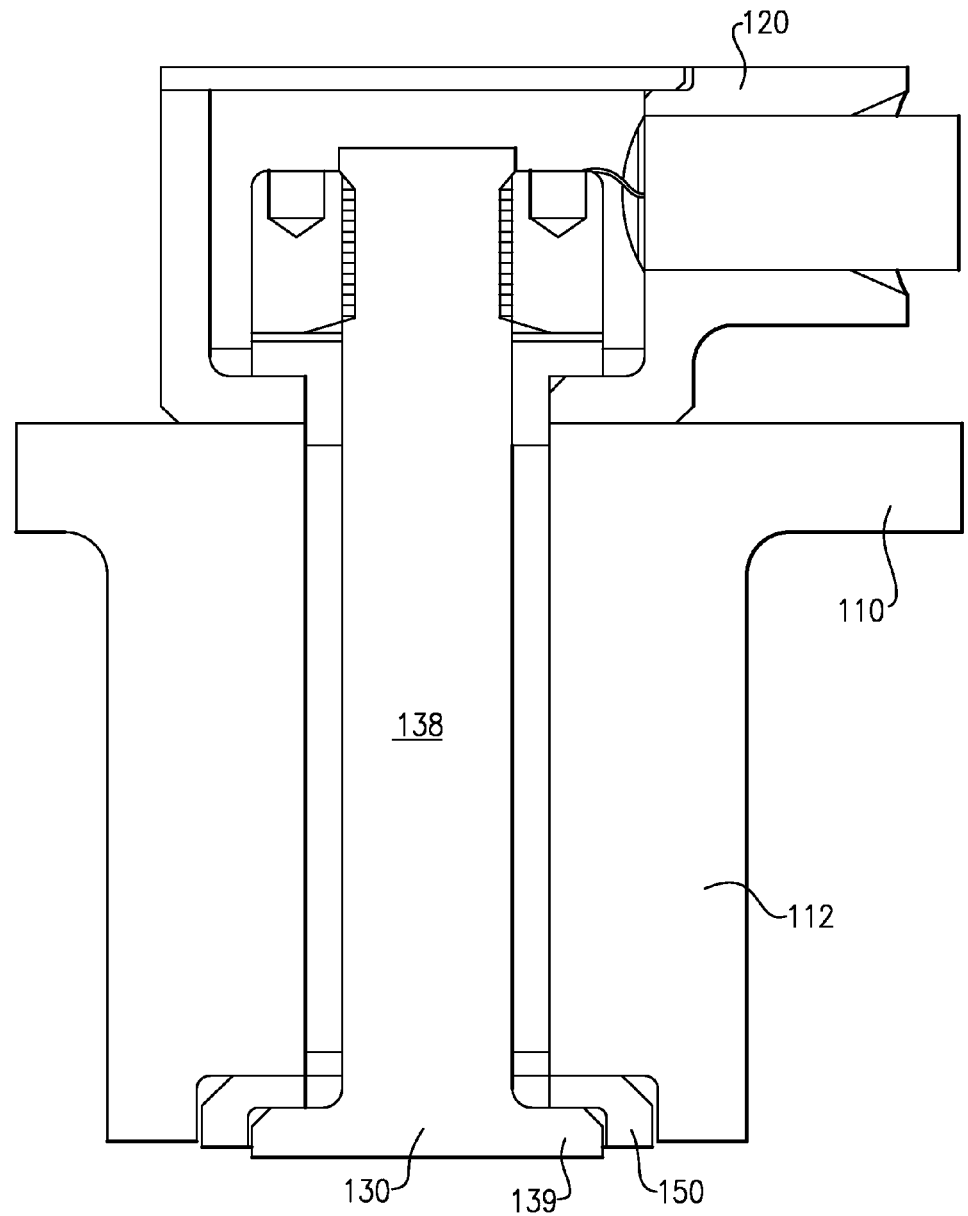
FIG. 3 illustrates a cross section of an alternative capacitance probe of FIG. 1.

With continued reference to FIG. 2, FIG. 3 illustrates a second example capacitance probe 100, with like numerals indicating like elements. The second example capacitance probe 100 differs from the first example capacitance probe 100 in that the second example capacitance probe 100 is positioned over an internal feature 112 of the outer air seal wall 110, and incorporates the internal feature 112 of the outer air seal wall 110 in the capacitance probe housing. By elongating the sensor rod stem 138, incorporating the sensor rod stem 138 in the internal feature 112, and only requiring the tip of the internal feature 112 to accommodate the larger diameter of the sensor face 139 and the inner ceramic 150, negative impact on the structural durability of the internal feature 112 is minimized, and the amount of tool work and reoperating that must be done on the outer air seal wall 110 to include the capacitance probe is minimized. This further provides the advantage of allowing a capacitance probe 100 to be incorporated at any point along a surface, regardless of internal features thereby improving the flexibility in component design.

In each of the above described examples, the partial sensor housing 120 and the outer air seal wall 110 are composed of materials having different coefficients of thermal expansion. As a result, partial sensor housing 120 and the outer air seal wall 110 expand and contract at different rates. By selecting appropriate materials, the partial sensor housing 120 and the outer air seal 110 are guaranteed to expand at a rate faster than the sensor rod 130. As a result of the mismatched thermal expansion, the sensor rod 130 is maintained in tension despite thermal expansion. In contrast, arrangements utilizing materials with the same or similar coefficients of thermal expansion can loosen when the materials expand resulting in the sensor rod 130 becoming misaligned. In one example arrangement, the coefficient of linear thermal expansion of the partial sensor housing 120 is greater than the thermal coefficient of the outer air seal wall 110 and the sensor rod 130.

Figure 4:
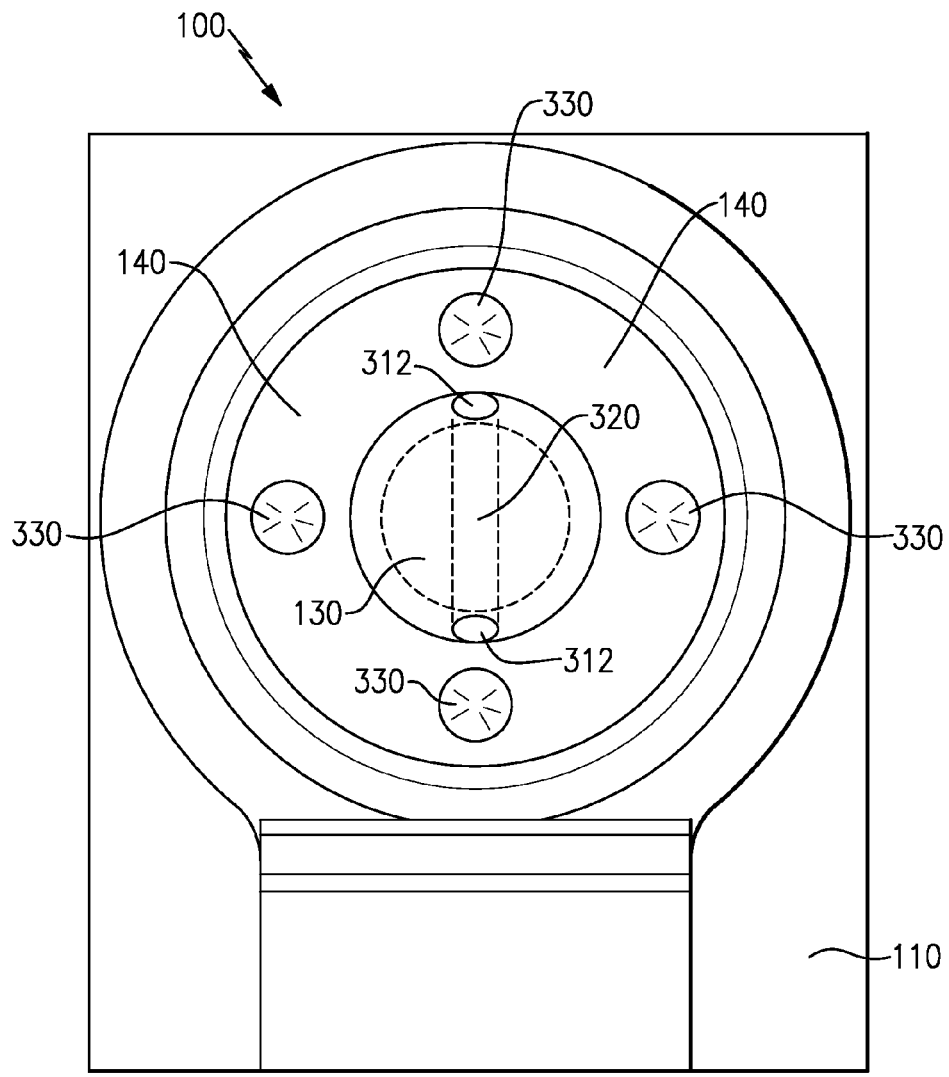
FIG. 4 illustrates a top view of the capacitance probe of FIG. 1.

With continued reference to FIGS. 2 and 3, FIG. 4 illustrates a top view of the capacitance probe 100 of FIG. 2, with the cap 180 omitted. Features of the top surface of the nut 140 and the sensor rod 130 are shown. The sensor rod 130 includes a trough 320 that interfaces with a tool, such as a screwdriver, to hold the sensor rod 130 in place during installation of the capacitance probe 100. The nut 140 includes multiple divots 330 that are used in conjunction with a specialized tool to turn the nut 140 and tighten it during installation.

Once the nut 140 is fully tightened, the senor rod 130 is attached to the nut 140 via spot welds at each of the weld positions 312. In the illustrated example, the weld positions 312 are at opposite ends of the trough 320. In alternate examples, different numbers of spot weld locations 312 and different locations along the circumference of the sensor rod 130 can be used.

While the above described capacitance probe is incorporated in an outer air seal wall, it is understood that the described capacitance probe can be incorporated in any similar structure using the same arrangement.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An outer air seal case for a turbine engine comprising:
a housing of a turbine engine outer air seal, the housing of the turbine engine outer air seal having a sensor opening;
a partial sensor housing contacting said housing of a turbine engine outer air seal; and
a sensor rod extending from said partial sensor housing through said sensor opening in said housing of a turbine engine outer air seal such that said partial housing and said housing of a turbine engine outer air seal combine to operate as a complete sensor housing;
a first sensor rod support pad positioned in said partial sensor housing and a second sensor rod support pad positioned in said housing of a turbine engine outer air seal, wherein each of said first sensor rod support pad and said second sensor rod support pad maintain said sensor rod in position within the outer air seal case, wherein each of said first and said second sensor rod support pads are under compression.

2. An outer air seal case for a turbine engine comprising:
a housing of a turbine engine outer air seal, the housing of the turbine engine outer air seal having a sensor opening;
a partial sensor housing contacting said housing of a turbine engine outer air seal;
a sensor rod extending from said partial sensor housing through said sensor opening in said housing of a turbine engine outer air seal such that said partial housing and said housing of a turbine engine outer air seal combine to operate as a complete sensor housing; and
wherein a combination of said partial sensor housing and said housing of a turbine engine outer air seal has a first thermal expansion rate, said sensor rod has a second thermal expansion rate, and said first thermal expansion rate and said second thermal expansion rate are different.

3. The outer air seal case of claim 2, further comprising a first sensor rod support pad positioned in said partial sensor housing and a second sensor rod support pad positioned in said housing of a turbine engine outer air seal, wherein each of said first sensor rod support pad and said second sensor rod support pad maintain said sensor rod in position within the outer air seal case.

4. The outer air seal case of claim 2, wherein said partial sensor housing further comprises a lead egress and a cap.

5. The outer air seal of claim 2, wherein the first thermal expansion rate is greater than the second thermal expansion rate, thereby maintaining the sensor rod in tension.

6. The outer air seal case of claim 2, wherein said sensor opening comprises a hole defining an axis, and wherein said hole has a first width perpendicular to said axis along a first portion of said axis and a second width perpendicular to said axis along a second portion of said axis.

7. The outer air seal case of claim 6, wherein said first width and said second width are different widths.

8. The outer air seal case of claim 2, further comprising a nut within said partial sensor housing, wherein said nut is interfaced with said sensor rod, thereby anchoring said sensor rod in place.

9. The outer air seal case of claim 8, wherein said nut is threaded and is interfaced with a threaded portion of said sensor rod.

10. The outer air seal case of claim 8, wherein said sensor rod is fixed to said nut via a weld.

11. The outer air seal case of claim 8, wherein said nut and said housing of a turbine engine outer air seal maintain said sensor rod in tension.

12. A capacitance based clearance probe comprising:
a partial sensor housing mounted on a surface;
a sensor rod anchored in said partial sensor housing and extending into a sensor opening in said surface such that said partial sensor housing and said surface combine to operate as a complete sensor housing;
wherein the sensor rod is a component of a capacitance sensor; and
a combination of said partial sensor housing and an outer air seal has a first thermal expansion rate, said sensor rod has a second thermal expansion rate, and said first thermal expansion rate and said second thermal expansion rate are different.

13. The capacitance based clearance probe of claim 12, wherein said sensor opening comprises a hole defining an axis, and wherein said hole has a first width perpendicular to said axis along a first portion of said axis and a second width perpendicular to said axis along a second portion of said axis.

14. The capacitance based clearance probe of claim 12, wherein said partial sensor housing further comprises a lead egress and a cap.

15. The capacitance based clearance probe of claim 12, wherein the first thermal expansion rate is greater than the second thermal expansion rate, thereby maintaining the sensor rod in tension.

16. The capacitance based clearance probe of claim 12, wherein the sensor rod is a single piece.

17. The capacitance based clearance probe of claim 12, further comprising a nut within said partial sensor housing, wherein said nut is interfaced with said sensor rod, thereby anchoring said sensor rod in place.

18. The capacitance based clearance probe of claim 17, wherein said nut is threaded and is interfaced with a threaded portion of said sensor rod.

19. The capacitance based clearance probe of claim 17, wherein said sensor rod is fixed to said nut via a weld.

20. The capacitance based clearance probe of claim 17, wherein said nut and said outer air seal housing maintain said sensor rod in tension.

21. A capacitance based clearance probe comprising:
a partial sensor housing mounted on a surface;
a sensor rod anchored in said partial sensor housing and extending into a sensor opening in said surface such that said partial sensor housing and said surface combine to operate as a complete sensor housing;
wherein the sensor rod is a component of a capacitance sensor; and a first sensor rod support pad positioned in said partial sensor housing and a second sensor rod support pad positioned in an outer air seal housing, wherein each of said first sensor rod support pad and said second sensor rod support pad maintain said sensor rod in position within an outer air seal case.

22. The capacitance based clearance probe of claim 21, wherein each of said first and said second sensor rod support pads are under compression.

\* \* \* \* \*